United States Patent [19]
Goszyk

[11] Patent Number: 6,095,928
[45] Date of Patent: Aug. 1, 2000

[54] THREE-DIMENSIONAL OBJECT PATH TRACKING

[76] Inventor: Kurt A. Goszyk, 17 Lookout La., Washington Crossing, Pa. 18977

[21] Appl. No.: 09/209,506

[22] Filed: Dec. 10, 1998

Related U.S. Application Data

[60] Provisional application No. 60/067,766, Dec. 10, 1997.

[51] Int. Cl.[7] ................................................. A63B 69/36
[52] U.S. Cl. ........................ 473/222; 473/156; 345/158; 356/139.03
[58] Field of Search ............................. 348/39, 218, 383, 348/38, 14, 580, 585, 581; 345/158; 473/222, 156, 209, 212; 356/139.03; 273/DIG. 24

[56] References Cited

U.S. PATENT DOCUMENTS

| | | | |
|---|---|---|---|
| 4,137,566 | 1/1979 | Haas et al. | 364/410 |
| 4,545,576 | 10/1985 | Harris | 273/25 |
| 5,110,202 | 5/1992 | Dornbusch et al. | 356/1 |
| 5,257,084 | 10/1993 | Marsh | 356/28 |
| 5,495,576 | 2/1996 | Ritchey | 395/125 |
| 5,936,722 | 8/1999 | Armstrong et al. | 356/139.03 |
| 5,990,472 | 11/1999 | Rinne | 250/214.1 |

*Primary Examiner*—Stephen F. Gerrity
*Assistant Examiner*—Rhonda E. Sands
*Attorney, Agent, or Firm*—Duane, Morris & Heckscher LLP

[57] ABSTRACT

Capturing the path of an object moving through a sensing volume defined by a three-dimensional (3D) coordinate system. First, second, and third angle detectors are mounted in a common housing positionable at a vertex of a sensing cone encompassing the sensing volume, said first, second, and third detectors being separated from one another by known, fixed distances. Each detector receives a respective light beam from the object having a respective angle relative to a respective reference line of the 3D coordinate system, and provides a signal corresponding to said respective angle. At successive samples, successive coordinate positions of the object within the sensing volume are determined, given the first, second, and third angles at each said sample to determine said path, and the path is displayed.

15 Claims, 9 Drawing Sheets

210

220

THREE-DIMENSIONAL OBJECT PATH TRACKING

CROSS-REFERENCES TO RELATED APPLICATIONS

This nonprovisional U.S. national application, filed under 35 U.S.C. § 111(a), claims, under 37 C.F.R. § 1.78(a)(3), the benefit of the filing date of provisional U.S. national application Ser. No. 60/067,766, filed on Dec. 10, 1997 under 35 U.S.C. § 111(b), the entirety of which is incorporated herein by reference.

BACKGROUND OF THE INVENTION

1. Field of the Invention

The present invention relates to systems and methods for capturing and tracking the three-dimensional (3D) coordinate path of a moving object and, in particular, to tracking and providing visual feedback for the X,Y,Z trajectory path of a swinging object such as a golf club or of a projectile such as a baseball.

2. Description of the Related Art

Various devices are used to capture path data from moving objects. For example, devices such as electronic graphic sketch pads, digitizing tablets, electronic white boards, and copy boards are widely used to capture two dimensional (2D) X,Y coordinate path data from a moving stylus being manipulated by a human user or other stylus manipulator such as a robotic arm. For example, such devices are used for real-time capture of hand-written notes, drawings and sketches, machine tool placement, robotic arm positioning, and sensory feedback for motion training. Such captured data is typically stored in computer memory or provided to a network for mass storage, manipulation, or distribution to participants in a data conference.

Sensing devices may also be used to capture and track the 3D coordinate path of a moving object. For example, it may be desired to employ such 3D tracking devices to track the X,Y,Z trajectory or path of a swinging object such as a golf club or of a projectile such as a baseball, and to provide visual feedback of the tracked path. This may be useful to a human user of the object, for example to improve a golf swing.

Conventional 3D path tracking typically has employed devices and techniques such as magnetic field motion tracking, optical tracking, CCD cameras, and mechanical articulated arms. Some such systems have typical capture rates of 120 to 3,500 samples per second, can cost between $1,500 to $30,000, and are large and cumbersome. Existing swing trajectory tracking devices include 2D optical plane sensors, magnetic field, and mechanical swinging machines. However, the 2D systems do not provide true 3D path tracking, require close sensing proximity to the object (e.g., club or bat), and provide relatively poor visual feedback. In addition, some previous systems can be prone to outside magnetic interference, can consume relatively large amounts of power, and are too cumbersome and/or constricted by wire cables are harnesses to be easily portable.

SUMMARY

A system for capturing the path of an object moving through a sensing volume defined by a three-dimensional (3D) coordinate system. First, second, and third angle detectors are mounted in a common housing positionable at a vertex of a sensing cone encompassing the sensing volume, said first, second, and third detectors being separated from one another by known, fixed distances. Each detector receives a respective light beam from the object having a respective angle relative to a respective reference line of the 3D coordinate system, and provides a signal corresponding to said respective angle. At successive samples, successive coordinate positions of the object within the sensing volume are determined, given the first, second, and third angles at each said sample to determine said path, and the path is displayed.

DESCRIPTION OF THE PREFERRED EMBODIMENT

There is provided herein an 3D path capture and visual feedback system, which captures the X,Y,Z, path of a moving object. In one embodiment, the 3D path capture system is a golf swing analyzer which captures and stores the swing or path of a swinging golf club head. The 3D trajectory of the club head is captured in real time using geometrically positioned solid state position sensitive detectors (PSDs) or solid state incident angle detectors (IADs) having, in one embodiment, at least a 10,000 sample per second scan rate. In addition, in an alternative embodiment, the system captures and displays the club head rotation (yaw) at a predetermined point in the 3D space (usually at the point of impact where the club meets the golf ball, e.g. the tee, as established during initial calibration). From the trajectory data, the system can also determine club head speed and acceleration, and can calculate the estimated ball distance, as described in further detail below. The captured path and rotation are displayed with respect to an ideal path and rotation for comparison thereto. The present invention provides for 3D object path capture at low cost and in a compact, portable, low-power system in a single housing.

The present invention, therefore, provides for the capturing and storing data for at least three degrees of freedom (X, Y and Z), and up to six degrees of freedom (X, Y, Z, pitch, yaw, and roll), of a moving object path within a predetermined sensing volume and visually displays that path on a computer screen or suitable visual output device such as a flat-panel liquid crystal display (LCD). The user of the invention can visually compare the captured path against a predetermined ideal path stored in memory or calculated on the fly, and displayed superimposed with the captured path for training enhancement.

Figure 1:
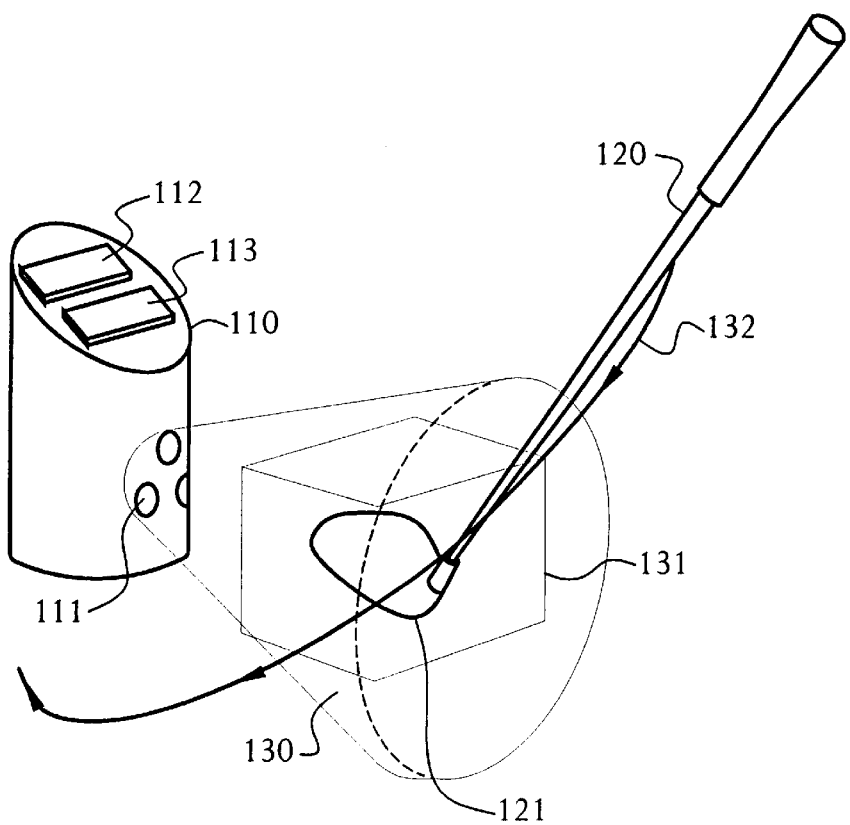
FIG. 1 illustrates a 3D path capture and tracking system for use in capturing and detecting the swing trajectory of a golf club, in accordance with an embodiment of the present invention.

Referring now to FIG. 1, there is shown a 3D path capture and tracking system 100 for use in capturing and detecting the swing trajectory of a golf club 120, in accordance with an embodiment of the present invention. System 100 also includes 3D swing sensor and path analyzer module 110, which may comprise a common housing of portable size, similar in size to a standard golf tee box and placeable on the ground near a golf tee. Analyzer module 110 comprises LCDs 112, 113, on top of the housing, and sensors 111 mounted nearby on a face of the housing. Other circuitry, power supply, components, and processor devices are also included within the housing, as described in further detail below with reference to FIGS. 3, 4A, 7, and 10. Golf club 120 comprises shaft portion and club head 121, and also includes reflective portions as described in further detail below with reference to FIGS. 8 and 9. When swung by a user (right-handed as illustrated), a 3D path or swing trajectory 132 of club head 121 is traced in 3D space. Part of path 132 lies within 3D volume 131, which itself is encompassed within sensing cone 130, which emanates from or has its vertex at the sensing portion 111 of analyzer module 110, as described in further detail below with reference to FIGS. 4A and 7. Sensing cone 130 emanates from an IR LED or laser source, as discussed in further detail below, and reflects off of a reflecting portion attached to golf club 120 so that the reflecting rays can be detected by sensors 111 to determine the instantaneous 3D position of the golf club head at each sample, which can thereby be used to construct the actual golf club head path within and even extending from 3D volume 131, using extrapolation. 3D volume 131 may be considered to be a roughly cubical motion tracking box having X,Y,Z coordinates, in which path 132 may be detected by 3D swing sensing module 110. 3D volume or tracking box 131 is positioned such that it includes the point of impact of the club (e.g., the tee) as well as an ideal club head path and a margin of error to include expected actual club head 121 paths that deviate to some degree from the ideal path.

Figure 2A:
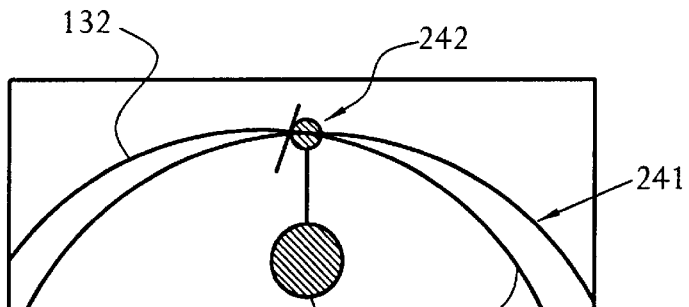
FIGS. 2A and 2B are top and back perspective views, respectively, of the swinging golf club illustrated in the displays of the system of FIG. 1 and visual feedback of the system of FIG. 1.
Figure 2B:
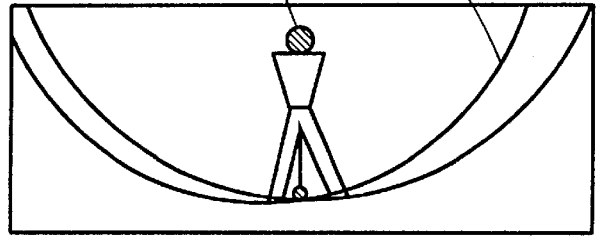

Referring now to FIGS. 2A and 2B, there are shown top and back perspective views 210, 220, respectively, of the swinging golf club head 121, and visual feedback, illustrated in the displays 112, 113 of system 100 of FIG. 1. (View 220 may also be used, in an alternative embodiment, to show the front view of the golfer rather than the back view.) In each view 210, 220, the human user is illustrated by icon 240, and an ideal golf club head path or swing trajectory is shown via a solid line (path 132). Also shown via dotted lines is the actual path of the most recent, captured golf club head 121 swing or path 132. In addition, in top perspective view 210, the club head 121 face angle or rotation 242 at the point of impact (typically, the tee) is illustrated as shown.

The data provided in LCDs 210, 220 can be useful to a golfer in improving her swing so that it more closely matches an ideal golf swing. For example, flat-panel LCDs 112, 113 simultaneously show a superimposed, predetermined ideal trajectory path or arc 132 derived from the laws of motion and pre-programmed golf-related information for each view. In addition, as explained above, top perspective view 210 shows the actual club head face angle 242 at the predetermined point of impact, which is displayed as an offset to the predetermined ideal club face angle.

From this visual feedback, the golfer can improve her swing by attempting to match components of her swing against the superimposed ideal reference trajectories and club head angles in the displayed views 210, 220 in LCDs 112, 113. For example, the deviation between actual swing 132 and ideal swing 241 shown in top perspective view, along with the "open" angle of the golf club head at the point of impact, shows that the user would most likely hook the ball. The back (or front) perspective view 220 shows the actual swing 132 hitting too much downward causing the club to ground and to hit the ball "fat".

The golfer can achieve further improvement by maximizing the club head speed at the point of impact for maximum ball flight distance. The golfer can use the system with or without a ball, and without a special hitting pad. The system is immune to ambient light and can be used both indoors and outdoors.

As shown, three sensors 111 are employed, arrayed in a roughly triangular layout on a face of module 110. Each sensor determines an angle measurement. These sensors are separated by known distances and thus can use triangulation to determine the 3D position of the ball at each sample. From the succession of sampled positions, path 132 may be determined and stored. In addition, because the time between each sample is known, speed and acceleration may be determined or extrapolated at any point along path 132. In an alternative embodiment, LCDs 210, 220 may display other information about path 132 in addition to that illustrated in views 210, 220, such as instantaneous speed or acceleration along different points or at selectable points of path 132, for comparison to similar information about ideal path 241. For example, in one corner of view 210, a number may be displayed showing the speed of golf club head 121 at the point of impact.

In one embodiment, each of the three sensors 111 is a position sensitive detector (PSD). In another embodiment, each of the three sensors 111 is an IAD. In either case, the sensors each detect the angle with respect to a reference angle such as orthogonal to the sensor, of a light beam ray reflecting off of a reflective portion of golf club 120, typically on or near golf club head 121. Thus, by using 2 PSDs or IADs placed side by side with a small, known separation between them, the resulting sensor system can determine, through triangulation, the coordinate position of an object in two dimensional space. Three sensors, such as employed by the path tracking system of module 110, can provide 3D path data for the path traced by golf club head 121.

As will be appreciated, PSDs are optoelectronic sensors that provide continuous position data of light spots traveling over their one dimensional linear photosensitive surfaces.

They consist of a P-layer and an N-layer separated by an insulator. When a light spot falls on the P-layer surface of the PSD, an electric charge proportional to the light energy is generated by the incident position. This charge is driven through the top P-layer of the device and collected by electrodes at each end of the one dimensional linear PSD. Since the resistivity of the P-layer is uniform, the photocurrent collected by an electrode is inversely proportional to the distance between the incident position and the electrode. The formula representing the ratio of the electrode currents is described in Eq. (1):

$$I_1/I_2 = (L-2X_a)/(L+2X_a) \tag{1}$$

where $I_1$ is the current at electrode 1, $I_2$ is the current at electrode 1, L=the total length of the PSD photoresistive surface, and $X_a$ is the distance of the incident light spot from the center of the PSD. Because it is a ratio, the position can be found irrespective of the energy of the incident light. By expanding Eq. (1) further, we have Eq. (2) as follows:

$$2K_a/L = (I_2-I_1)/(I_2+I_1) \tag{2}$$

Figure 3:
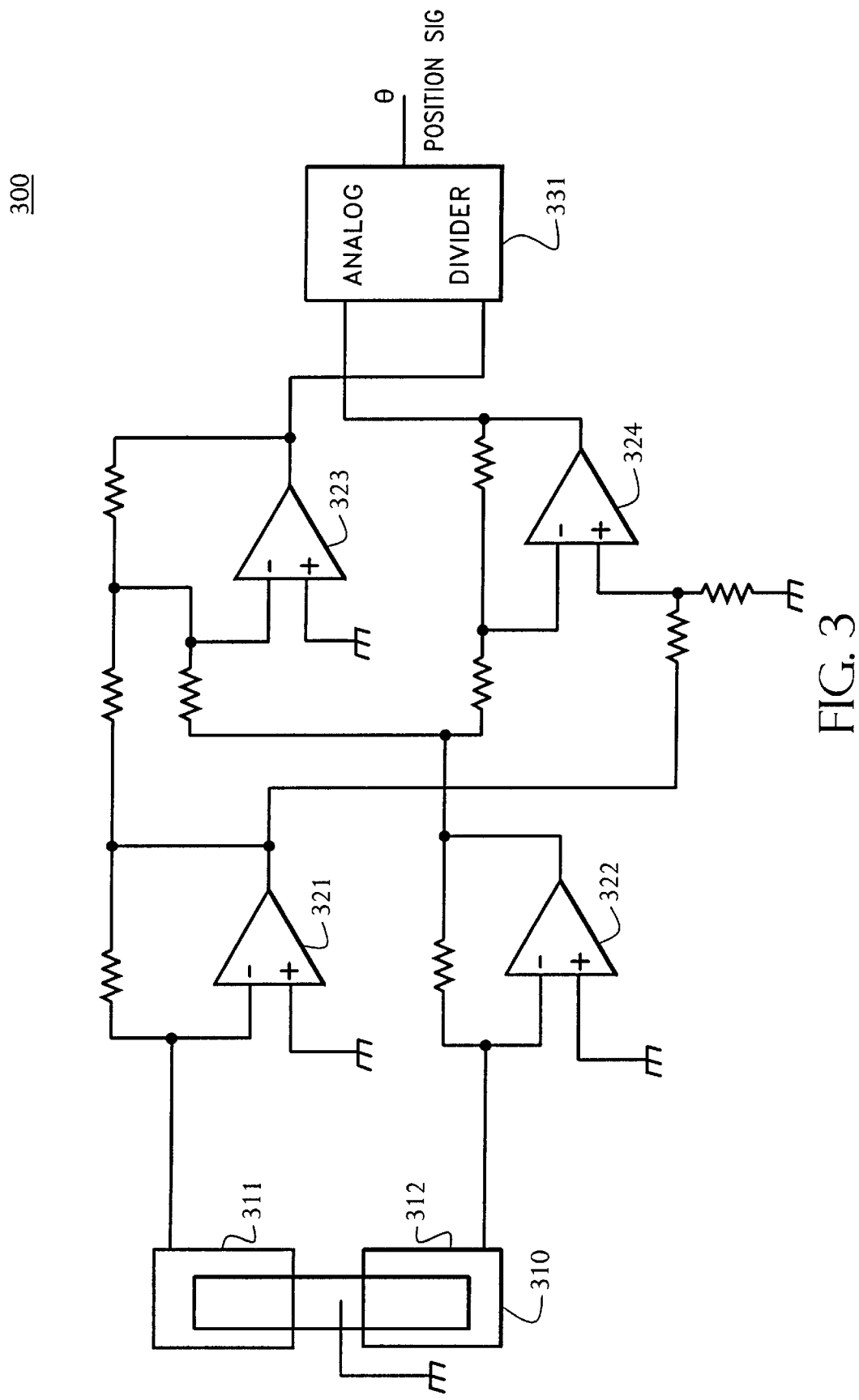
FIG. 3 is a schematic diagram of a circuit for implementing an equation for determining the incident angle $\theta$ of light falling upon the two elements of an IAD or PSD of the system of FIG. 1.

Referring now to FIG. 3, there is shown a schematic diagram of a circuit 300 for implementing Eq. (2) for determining the incident angle θ of light falling upon the two elements of an IAD or PSD of the system of FIG. 1. Circuit 300 comprises a PSD 310 having two elements or ends 311, 312, operational amplifiers (op amps) 321, 322, 323, and 324, and analog divider 331. Elements 311, 312 are two electrodes at opposite ends of PSD 310's continuous, linear strip of photosensitive surface, and thus provide the two PSD signals. Op amp 323 provides a signal to analog divider equal to the sum of the two element signals, while op amp 324 provides the difference thereof. Analog divider thus divides said difference by sa id sum and scales it by an appropriate constant, as described further below with reference to Eq. (3). Circuit 300 can also represent an embodiment of the invention employing IADs instead of PSDs, in which case device 310 is an IAD, and elements 311, 312 are the two photodiodes of the IAD rather than two ends of a continuous PSD photodiode strip.

Figure 4A:
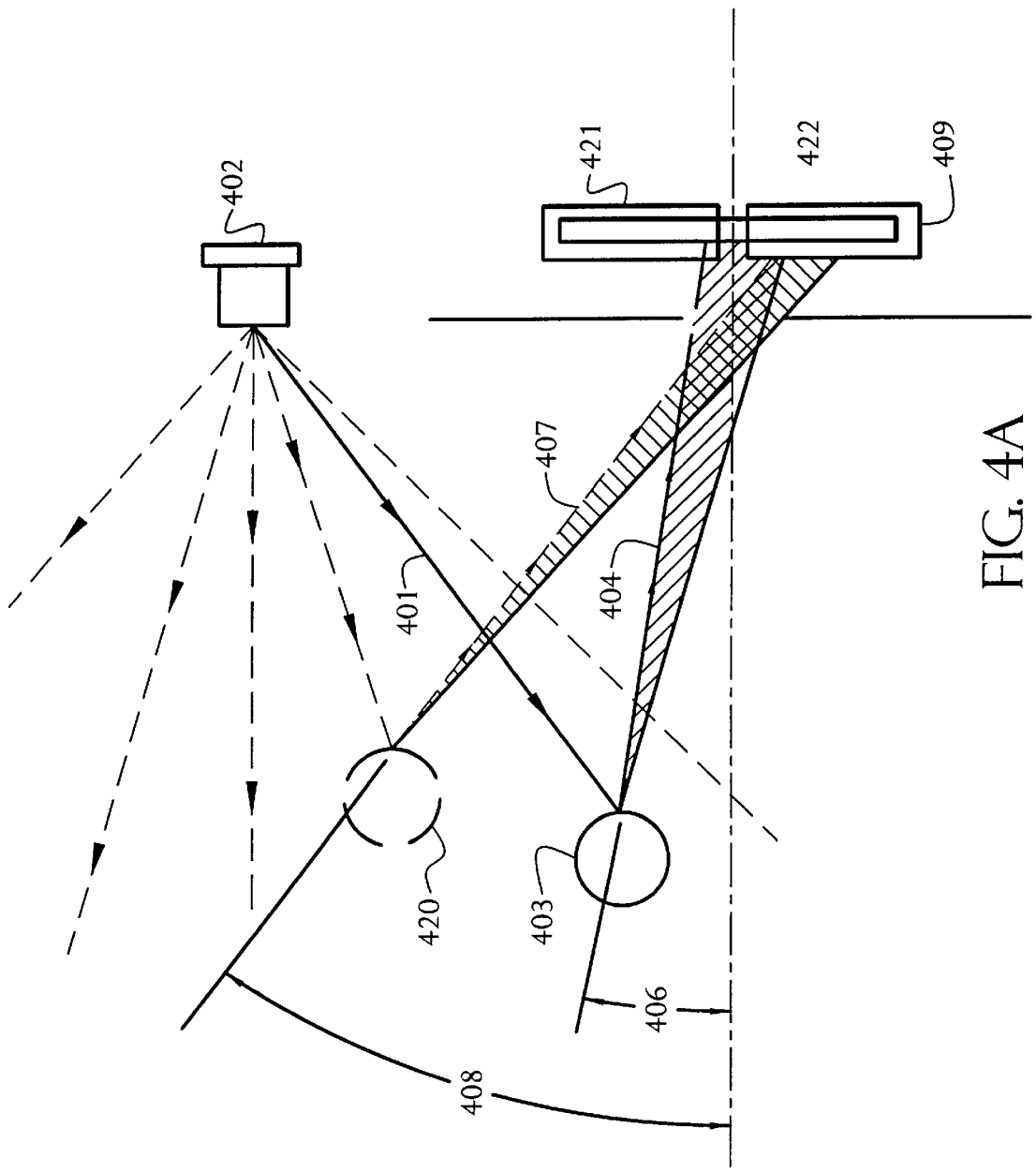
FIG. 4A is a block diagram of a 2D object path capture system and an IAD configured as an angle sensor.

In one embodiment, IADs are employed for sensors 111 in system 100. The operation of module 110 and system 100 will be described in further detail after first discussing the operation of a 2D object path tracking system. Referring now to FIG. 4A, there is shown a block diagram of a 2D object path capture system and a single IAD 409 configured as an angle sensor. Each IAD used as an angle sensor in the present invention consists of two photodiode chips (421, 422) placed side by side on a common substrate. A spatial filter or aperture 405 is also employed, consisting of a blocking element having therein a square hole smaller than the total photodiode area placed over the two diodes, as shown. In an embodiment, spatial filter 405 is physically separated from the surface of the photodiodes so that when light strikes the sensor in other than an orthogonal direction, the ratio of the difference of the two photodiode currents divided by the sum of the two diode currents is proportional to the incident angle of the light striking the sensor. This ratio calculation automatically compensates for variations in light intensity and temperature changes to enable the angle to be determined. This angle can be represented by Eq. (3) as follows:

$$\theta = k(I_2-I_1)/(I_2+I_2) \tag{3}$$

where k is some constant.

For example, a suitably reflective object (such as a stylus or golf club head with a reflective attachment) 403 receives light ray 401 from a divergent cone of light produced by an IR LED (or laser source) 402. Light ray 401 reflects off of object 403, and the reflected ray or ray cone 404 enters the IAD 409 through spatial filter or aperture 405, at a unique angle 406. If object 403 moves to a different position 420, a new reflected ray 407 enters spatial filter 405 at a new angle 408. It is noted that, as described above, because of the divergent cone of light which is reflected off of the reflective surface(s) of the object, the object provides (by reflection) a divergent cone of light which includes the particular light beams that are received by IAD 409 through its spatial filter 405. Because of the relatively wide-angled, cone-shaped light beam reflected by object 403, the placement of a housing such as module 110 is not critical, and the chance of successfully receiving the light reflected by object 403 is increased.

Figure 6:
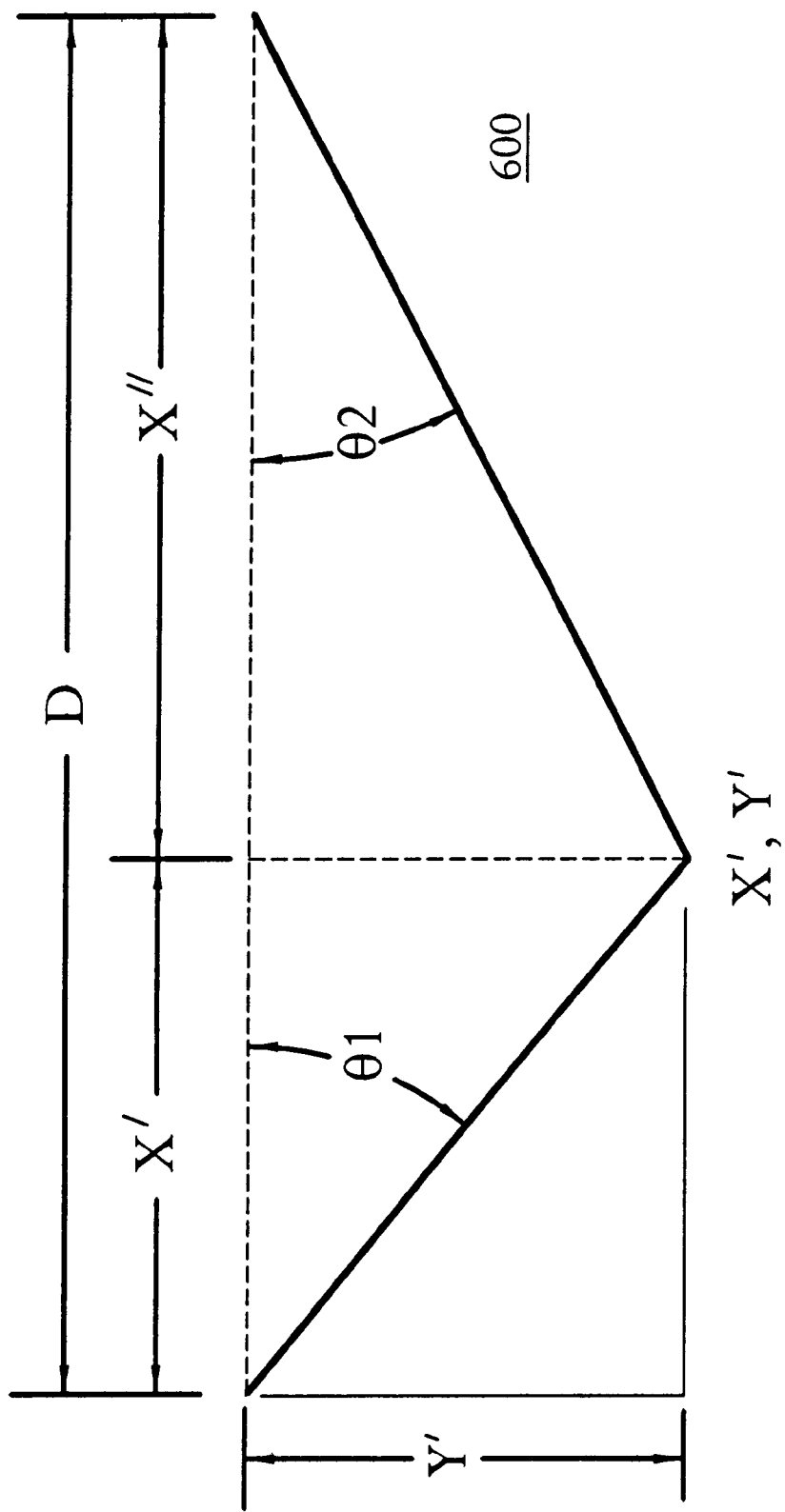
FIG. 6 is a trigonometric representation of the two-dimensional (2D) sensing plane used by the system of FIG. 5 to triangulate the object's position on a surface into X,Y coordinates.

Depending upon the angle of entry, the reflected rays strike IAD 409's two photodiode elements 421 and 422 with different intensities. Spatial filter 405 limits the number of reflected rays in order to define a discrete spot on the elements' sensitive areas. In alternative embodiments, a lens may also be used between or in front of spatial filter 405 and IAD 409 to concentrate more of the IR light for increased sensitivity. For small light-to-detector distances, no aperture or lens may be required. By processing the light spot ratio on the two elements 421, 422 of IAD 409, a processor can calculate the object's angle relative to a line connecting IADs 409, 439, as defined in Eq. (3), and as illustrated in FIG. 6.

Successive angle measurements may be made at each consecutive sample, and combined through triangulation with similar angle measurements made by the two other sensors 111 to determine the 3D path of the object 403 by combining the successive sample position calculations. Making such angle measurements through the continuous ratios of the light intensities striking the photodiode pair does not suffer from the resolution and speed limitations found in older electromechanical sequential scanning angle detectors which were used for determining angles of incident light rays. In addition, by employing such solid state sensors, accurate 3D object position measurements may be made employing three sensors separated by only a small known and fixed distance, and thus may be integrated into a common housing such as module 110, as further described below with reference to FIG. 7. This helps obviate the need to employ sensors placed at multiple locations around the perimeter of the area or volume containing the object path to be tracked. This, in turn, allows the three sensors to be rigidly aligned with one another so as to provide a fixed and consistent reference location for conversion of polar to rectangular coordinates. The use of a single location also simplifies the mathematics involved and can simplify system calibration.

Figure 4B:
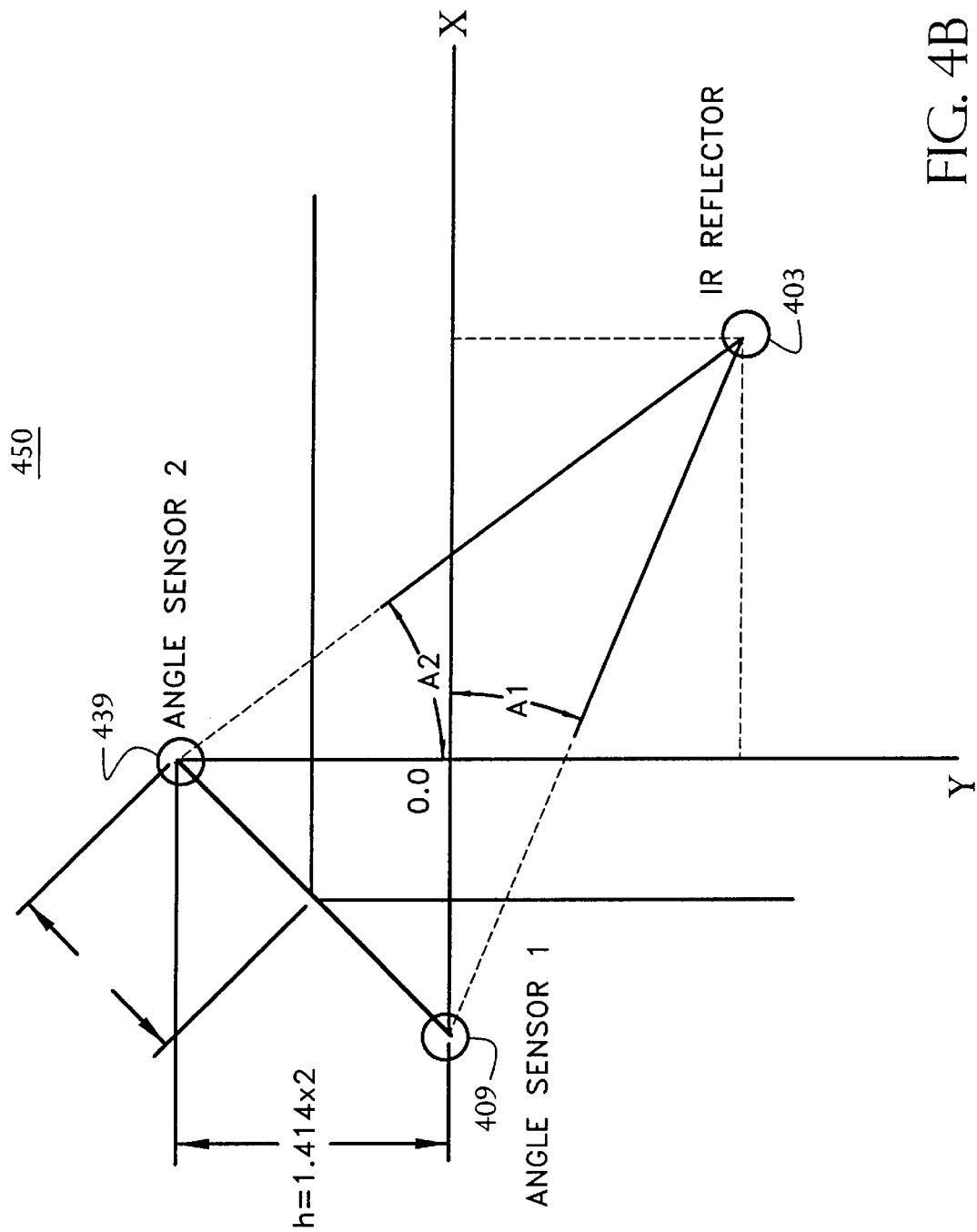
FIG. 4B is trigonometric representation of a two-dimensional (2D) sensing plane for sensing the 2D location of an object, using only two IADs located together at one corner of the 2D plane.

Referring now to FIG. 4B, there is shown a diagram 450 illustrating the trigonometric representation of a two-dimensional (2D) sensing plane for sensing the 2D location of object 403, sing only two IADs 409, 439 located together at one corner of the 2D plane. Diagram 450 thus illustrates the geometric relationships for calculating the rectangular coordinates from the angle sensor information at only one corner of an arbitrary 2D X,Y rectangular coordinate frame or plane. Employing diagram 450, Eqs. (4) and (5) may be used to convert angular polar information into rectangular coordinates:

$$X = h(\text{TAN A2})*(1+\text{TAN A1})/[1-(\text{TAN A1}*\text{TAN A2})] \tag{4}$$

$$Y = h(\text{TAN A1})*(1+\text{TAN A2})/[1-(\text{Tan A1}*\text{TAN A2})] \tag{5}$$

where h, A1, and A2 are the heights and angles as illustrated in FIG. 4B.

One inherent limitation of light-based coordinate tracking systems is the light intensity degradation at the square of the distance. It was determined that this physical property limits the useful tracking area to about a 4 foot by 3 foot area, in an exemplary 2D tracking system. The present invention, therefore, employs automatic light gain compensation or control (AGC) with each IAD sensor, which has been found to extend the area, to as much as a 9 foot by 6 foot 2D area. AGC is preferably implemented via a digitally programmable gain amplifier (AD526) available from Analog Devices, and a high speed version of the Intel 8052 microcontroller from Dallas Semiconductor (the DS80C320), which allows the gain range to be varied from 1 to 128. Because light intensity falls off with the square of distance, a large dynamic gain range is used to allow the sensors to "see" the object's motion.

Thus, the AGC of each IAD sensor ensures that the large dynamic IR signal range does not saturate the sensor's input amplifier when object 403 is close thereto, and ensures that the input signal can be amplified when object 403 is at comparatively greater distances from a given IAD sensor.

As explained above, in an alternative embodiment PSDs may be used instead of IADs. In such an embodiment, sensor 409 of FIG. 4A represents a PSD, which operates similarly to the IAD to detect the angle of the incident light ray except as follows. Depending upon the angle of entry, the reflected light rays 404 strike the PSD at different points along its linear sensing area. Spatial filter 405 limits the number of reflected rays in order to define a discrete spot on the PSD sensitive area. In alternative embodiments, a lens may also be used between or in front of spatial filter 405 and IAD 409 to concentrate more of the IR light for increased sensitivity. For small light-to-detector distances, no aperture or lens may be required. By processing the light spot position from the PSD, a processor can calculate the object's angle relative to a reference line, preferably the line between IADs 409, 439.

Figure 5:
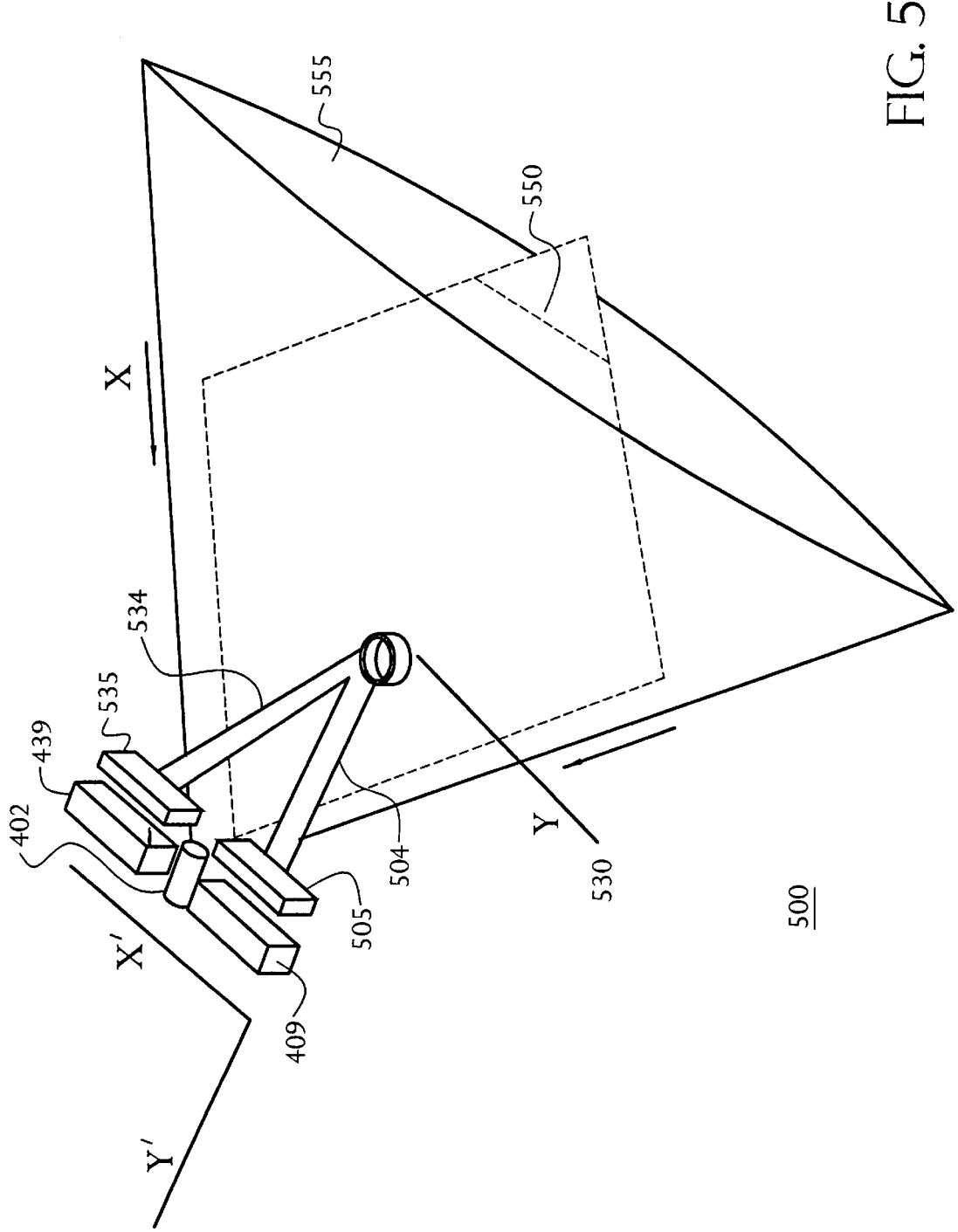
FIG. 5 is a perspective view illustrating a 2D data capture system employing a pair of IAD sensors.

The 3D path tracking of the present invention is explained by first describing the operation of a 2D object path tracking system. Referring now to FIG. 5, there is shown a perspective view illustrating a 2D data capture system 500 employing a pair of IAD sensors 409, 439. System 500 comprises two similarly-configured IADs, IADs 409 and 439 of FIGS. 4A and 4B, which have spatial filters 505, 535, respectively. A moving object 530 (such a spherical or partially spherical reflecting surface attached to a golf club head, as described in further detail below with reference to FIGS. 8 and 9) transmits reflected rays 504 and 534 to IADs 409 and 439, respectively. An imaginary X,Y plane 550 is defined with respect to a corresponding surface to which IADs 409 and 439 are mounted. An IR light cone 555 is emitted by IR source 402, which provides rays to be reflected from object 530 as reflected rays 504, 534. Cone 555 is provided by a fixed beam from source 402 diffracting through a conventional aspheric or convex lens.

Moving object 530 reflects incident IR rays from the IR LED source 402 through each spatial filter 505, 535 to its respective IAD angle sensor of IADs 409, 439. A processor uses the triangle formed by object 530 and angle sensors or IADs 409 and 439 to calculate an x and y intercept, referred to herein as X' and Y', along the axis of the two IAD sensors.

Using trigonometry, as illustrated in diagram 600 of FIG. 6, the solution for X' and Y' can be derived by solving the common altitude leg Y' from the tangent of the two angles as follows:

$$\tan\theta_1 = Y'/X'; \tan\theta_2 = Y'/X''; X' = Y'/\tan\theta_1, X'' = Y'/\tan\theta_2; D = X' + X'' \quad (6)$$

where D is the separation distance between the two IAD sensors 409 and 439. From these relationships, the value of Y' is determined as shown in Eq. (7):

$$Y' = X' \tan\theta_1 \quad (7)$$

The value for X' is shown in Eq. (8):

$$X' = D/[1 + (\tan\theta_1/\tan\theta_2)] \quad (8)$$

Because the two angle sensors (IADs 409, 439) form a leg of the triangle normal to the diagonal of 2D plane 550, X' and Y' represent the normalized coordinates used to plot a 2D trajectory path of moving object 530.

Figure 7:
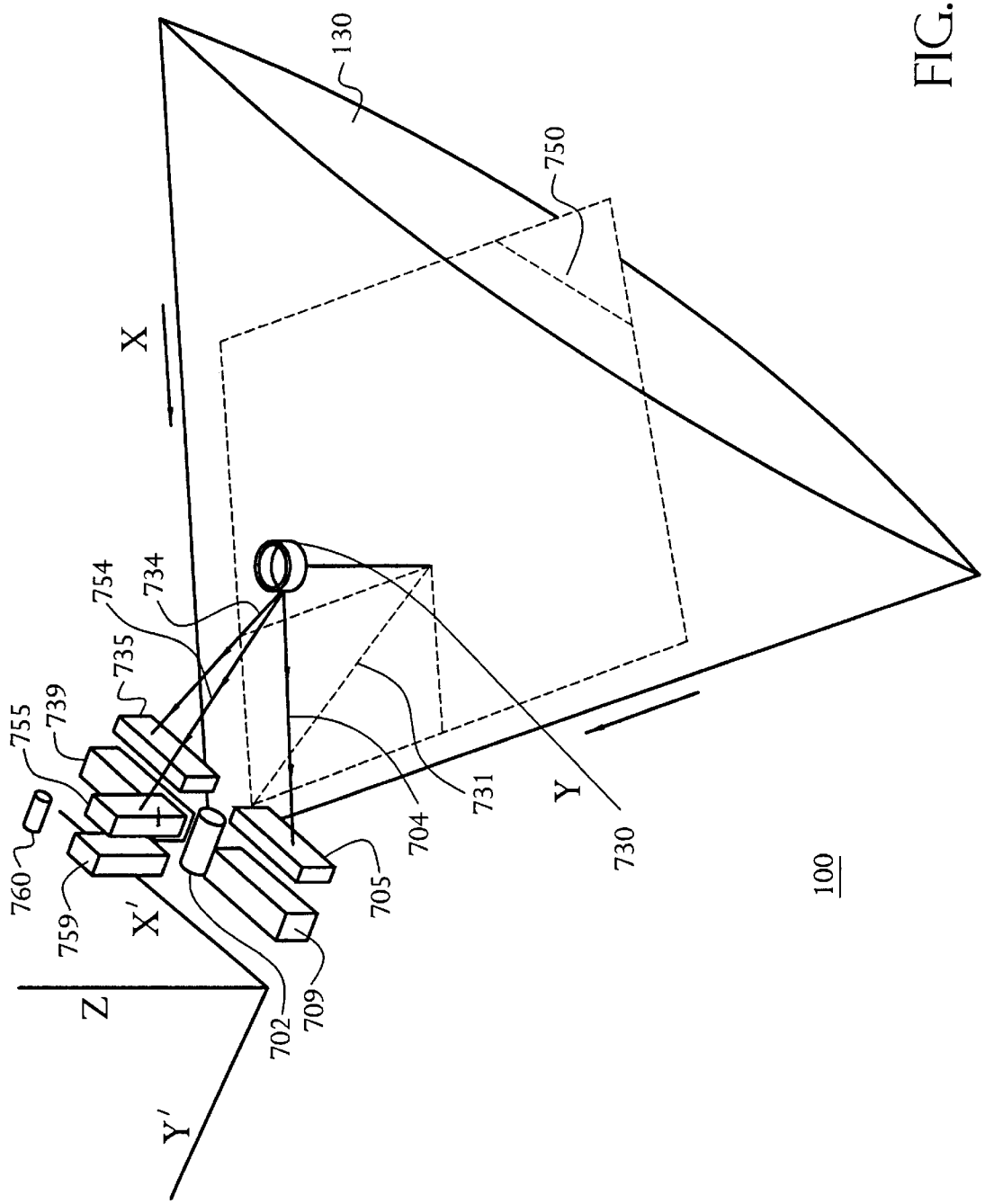
FIG. 7 is a perspective view illustrating the 3D data capture system of FIG. 1 in further detail.

The present invention adds a third angle sensor to system 500 of FIG. 5 to allow the determination of the Z coordinate position of an object for 3D path tracking. Referring now to FIG. 7, there is shown a perspective view illustrating the 3D data capture system 100 of FIG. 1 in further detail. System 100 is similar to that of 2D system 500 of FIG. 5, but, in addition to IADs 709, 739, also employs a third IAD 759 arranged above the first two. Thus, system 100 comprises three similarly-configured IADs 709, 739, and 759 (identified as sensors 111 in FIG. 1), which have spatial filters 705, 735, and 755 respectively. In addition, a single photodiode 760 is centered between IAD 709 and IAD 739 and above IAD 759, for detection of golf head club 121 face angle donation, as described in further detail below with reference to FIG. 9.

Figure 8:
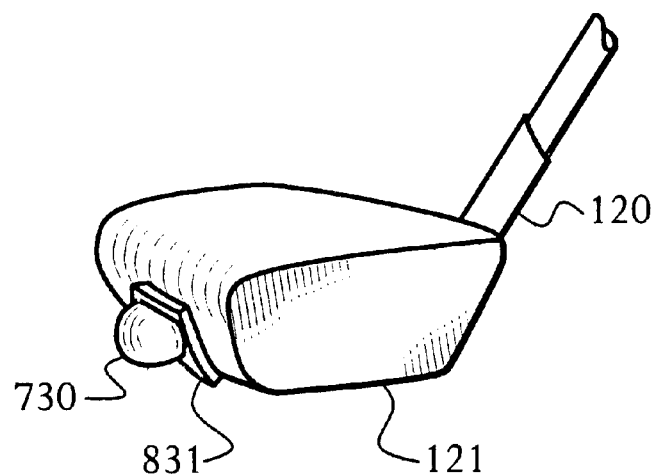
FIG. 8 illustrates a golf club head of the golf club of the system of FIG. 1, having attached thereto an adhesively-attached spherical plastic reflector mounted at the end of the club head, in accordance with an embodiment of the present invention.

A moving object 730 (such a spherical or partially spherical reflecting surface attached to a golf club head, as described in further detail below with reference to FIGS. 8 and 9) transmits reflected rays 704, 734, and 754 to IADs 709, 739, and 759, respectively. An imaginary X,Y plane or surface 750 is defined with respect to a corresponding surface to which module 710 and thus IADs 709 and 739 are mounted (e.g., the ground next to the golf tee). An IR light cone 130 is emitted by IR source 702, which provides rays to be reflected from object 730 as reflected rays 704, 734, and 754. Cone 130 is provided by a fixed beam from source 702 diffracting through a conventional aspheric or convex lens.

Moving object 730 reflects incident IR rays from the IR LED source 702 through each spatial filter 705, 735, 755 to it s respective IAD angle sensor of IADs 709, 739, 759. A processor provided within system 100 uses the triangle formed by object 730 and angle sensors or IADs 709 and 739 to calculate an X and Y intercept, referred to herein as X' and Y', along the axis of the two IAD sensors. Using trigonometry, as described above with respect to diagram 600 of FIG. 6, the solution for X' and Y' can be derived by solving the common altitude leg Y' from the tangent of the two angles. In one embodiment, a line joining IADs 709, 739 as well as their respective photodiode elements and lying within plane 750, is used as a reference to which to measure the angle of incident received light beams, as illustrated in FIG. 6. For IAD 759, the Z axis is used as a reference. Thus, in one embodiment, an incoming light beam normal to any of sensors or IADs 709, 739, 759 results in a 90° measurement.

The Z height value can be determined from the sine of the angle read from IAD 759, combined with the other information available from IADs 709, 739. In one embodiment, the derivation of the height Z uses the diagonal 731 formed by the X and Y dimensions in the two dimensional plane, whose value is X/sin θ1, where θ1 is the angle measured by IAD 709, and θ2 is the angle measured by IAD 739, as these terms are employed above with reference to system 100 of FIG. 7. Angle θ3 is the angle measured by IAD 759, so that the equation for Z is:

$$Z = \tan \theta 3 * X / \sin \theta 1 \qquad (9)$$

The three coordinates X, Y, X provide complete 3D coordinate information to represent the position of object 730 in three dimensional space.

To provide proper IR reflection by the club into the angle sensors, the present invention employs a club-attachable, spherical reflector preferably made of molded plastic and coated with a material formulated to optimally reflect IR light. Referring now to FIG. 8, there is shown golf club head 121 of system 100 of FIG. 1, having attached thereto an adhesively-attached spherical plastic reflector 730 mounted at an end of the club head 121, in accordance with an embodiment of the present invention. The spherical portion of reflector 730 need not necessarily contain an entire spherical surface but preferably enough thereof to suitably reflect IR light back to sensors 111 (IADs 709, 739, 759). As illustrated, reflector 730 contains a partial sphere section molded into a adhesive-backed back or attaching portion 831. As will be appreciated, the shape of spherical portion 730 is spherical (or part of a spherical surface) so that a sufficient number of IR rays are reflected in all directions to ensure passage through each angle sensor's spatial filter.

Figure 9:
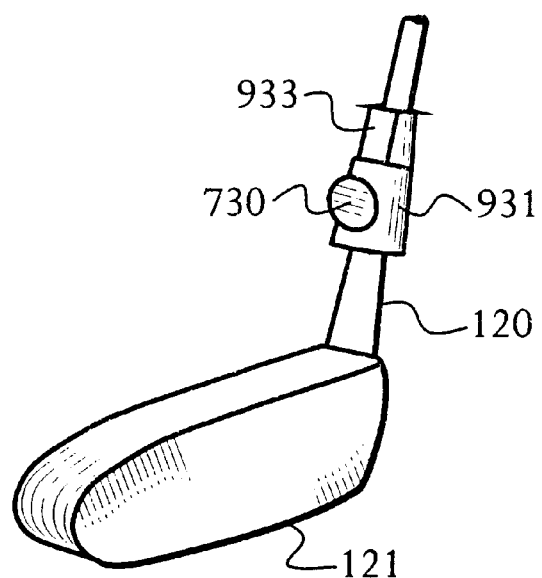
FIG. 9 illustrates a golf club head of the golf club of the system of FIG. 1, having attached thereto a snap-on spherical plastic reflector mounted at the shaft of the golf club and having a flat portion for detection of club head rotation (yaw), in accordance with an embodiment of the present invention.

Referring now to FIG. 9, there is shown golf club head 121 of system 100 of FIG. 1, having attached thereto a snap-on spherical plastic reflector 730 mounted at the shaft of the golf club near to the club head 121, and having a flat portion 933 for detection of club head rotation (yaw), in accordance with an embodiment of the present invention. As shown, the snap-on portion or attachment 931 contains a partial spherical reflective surface 730 as well as the flat reflective portion or surface 933.

To detect club face rotation angle at the predetermined point of impact (e.g., the golf tee), as explained above the present invention employs a single photodiode 760 centered between IAD 709 and IAD 739 and above IAD 759 of system 100 of FIG. 7. The flat portion 933 is provided having surface 933 that is aligned perpendicular to the axial center line of the rotational detection photodiode 760. This allows the reflection intensity from flat surface 933 to reach a maximum as sensed by photodiode 760 when the club head 121 face angle becomes normal (radial) to photodiode 760. A processor can correlate the moment that this occurs with the path 132 to determine where on the path the club face become normal, and can thus extrapolate and determine the angle of the club face at the point of impact. If the club face is square at the point of impact, IR rays will (maximally) enter the photodiode at a known X and Y coordinate position in the 2D plane. This known position is determined during an initialization calibration when system 100 is first set up to monitor the golf club swing. Therefore, photodiode 760 and associated circuitry is adapted to generate a pulse coincident with a known X, Y coordinate position stored in memory accessible to a processor or microcomputer used in module 110 in implementing the invention.

If the club face and the corresponding flat reflector 933 rotate to an angle not normal to the center line of the rotational detection photodiode 760, the flat reflector 933 will cause IR rays to trigger the photodiode circuit at an X, Y coordinate position before or after the previously stored point of impact X, Y coordinate position. Through trigonometric calculation, a processor can determine the actual club fact rotational (yaw angle) at the point of impact. The top perspective view 210 LCD 112 graphically represents this angle as an offset to the predetermined ideal club face angle.

As will be appreciated by those skilled in the art, by suitable extension of the flat reflector concept, additional flat reflectors and orthogonally-oriented photodiode detectors can be added to system 100 to determine pitch and roll angles as well.

Thus, by comparing the top view 210 and back view 220 of actual pa th 132, and club face rotation angle 242 graphical representations against the predetermined ideal path 241, the user of the invention can achieve immediate feedback of her swing efficiency. Through repetitive motion she can strive to improve her golf hitting performance.

Figure 10:
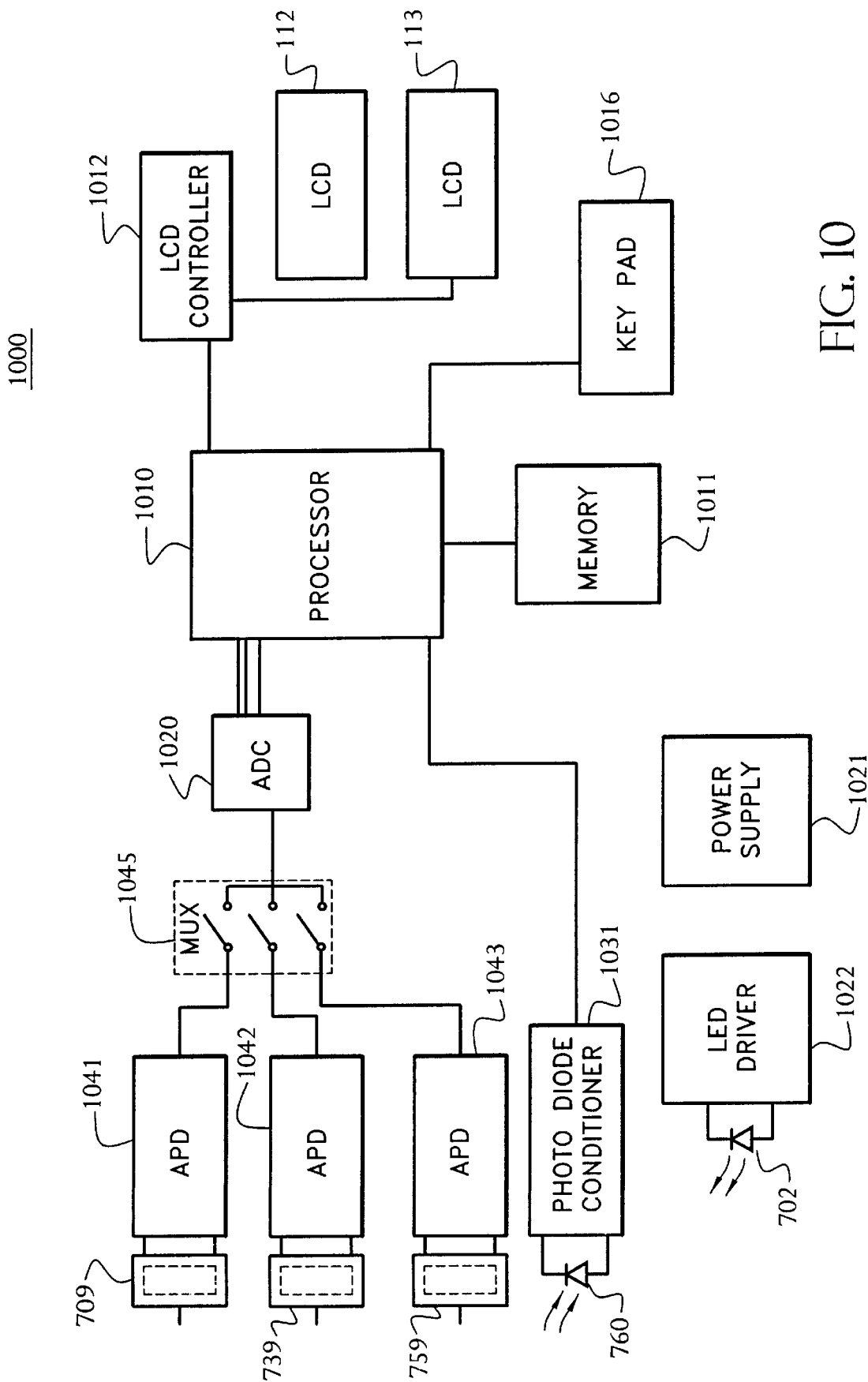
FIG. 10 is a block diagram of a computer implementation of the system of FIG. 1.

Referring now to FIG. 10, there is shown a block diagram 1000 of a computer implementation of system 100 of FIG. 1. As will be illustrated, block diagram 1000 illustrates the circuitry and processing system employed within module 110. Thus, block diagram illustrates the three IADs 709, 739, 759, each coupled to an analog position conditioner (APD) 1041, 1042, 1043, respectively, and photodiode 760 coupled to photodiode conditioner 1031. The output of the three APDs are coupled to a 12-bit analog-to-digital converter (ADC) 1020 via a 3 to 1 multiplexer (MUX) 1045, and through ADC 1020 to a processor or microcomputer 1010.

The output of photodiode conditioner 1031 is also coupled to processor 1010. Processor 1010 is further coupled to a memory device 1011, such as a RAM or ROM, which may be used to store captured actual paths and ideal paths or golf-related information used to generated ideal paths. Processor 1010 is also coupled to an LCD controller 1012, which controls the display of LCDs 112, 113. A key pad 1016 is also preferably coupled to processor 1010 for user input, calibration, and the like. System 100 also includes power supply 1021, and LED driver 1022, which drives IR source LED 702. LED driver circuit 1022 preferably generates a 10 KHz pulse to drive LED 702 at approximately a 50% duty cycle. This frequency is used to stay well away from indoor lighting at 50/60 Hz and to electronically filter ambient light from the sun.

APDs 1041, 1042, 1043 condition the signals received from the IADs, and also contain a high pass filter that passes pulsed IR light at approximately 10 KHz or higher. Together, therefore, the pulsed LED 702 and high pass filter in APDs filter out ambient light from all sources.

Once the angle signals from IADs 709, 739, 759, are conditioned by APDs 1041, 1042, 1043, they enter 3 to 1 MUX 1045. Processor 1010 selects each of the three signals rapidly in succession during a given sample period. ADC 1020 converts each of the three angle sensor's analog signals into digital values that processor 1010 can process. Once processor 1010 has all three angles, it processes the 3D coordinate information according to the equations described above and determines the instantaneous position of the golf club head.

As the golf club head travels through sensing volume 131, processor 1010 stores each 3D coordinate point along the swing path in RAM of memory 1011. Processor 1010 then calculates the data points necessary to plot a representative curve in top perspective view 210 and back perspective view 220 of LCDs 112, 113. Via LCD controller 1012, processor 1010 plots the actual top and back view trajectories on their respective dot matrix LCDs 1 12, 113. One of the LCDs also displays club head speed in miles per hour and acceleration in feet per second squared (at the point of impact), and estimated ball travel distance using an algorithm relating club head strike angle and speed.

Additional key switches on the device, such as key pad 1016, allow the system to be initialized during set-up, recall the last 10 stored swing trajectories, and provide data entry as to club type, date, time, and user statistics.

Accordingly, this invention provides a three-dimensional optical sensing system for measuring a moving object path within a predetermined sensing volume and for providing a visual display of that path for helping with training enhancements. This invention preferably includes a light source and a reflective medium on the moving object, and further includes a light sensor, such as a photodetector which can sense reflective light coming from said reflective medium. The device also includes processing means for producing a visual output which is indicative of the moving object path through the sensing area.

In addition to golf swing analysis, suitable embodiments of the present invention may be employed to capture and display other paths or trajectories, such as other sports swing trajectories including baseball, tennis, and hockey, as well as human head and eye motion tracking, and also projectile flight paths such as the flight path of a thrown or struck baseball, football, golf ball, basketball, and the like.

In further alternative embodiments, the present invention tracks the 3D path of a moving object containing its own light source, rather than one having a reflecting surface which reflects light from a light source which is part of path analyzer module 110. For example, in this alternative embodiment, path analyzer module does not comprise IR source 702 and an object whose path is to be tracked, such as object 730, need not have a reflective surface or attachment, but instead itself contains a suitable IR source. For example, object 730 may be a baseball having included therein a light source having sufficient spread and intensity to reach sensors of a device such as module 110, and also having enough integrity to withstand severe forces applied to the baseball when it is thrown and struck by a bat.

Those skilled in the art will understand that the present invention may also be modified to track stylus movement in a three-dimensional coordinate system. It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for capturing the path of an object moving through a sensing volume defined by a three-dimensional (3D) coordinate system, comprising:
   (a) a common housing positionable at a vertex of a sensing cone encompassing the sensing volume;
   (b) first, second, and third angle detectors mounted in the common housing, said first, second, and third detectors being separated from one another within said housing by known, fixed distances, wherein each said detector is for receiving a respective light beam from the object having a respective angle relative to a respective reference line of the 3D coordinate system, and for providing a signal corresponding to said respective angle;
   (c) means for determining, at successive samples, successive coordinate positions of the object within the sensing volume given the first, second, and third angles at each said sample to determine said path; and
   (d) means for displaying said path.

2. The system of claim 1, wherein means (d) comprises means for displaying said path and an ideal object path for comparison thereto.

3. The system of claim 2, further comprising memory means for storing said ideal path, wherein means (d) comprises means for displaying said path and said ideal path superimposed over each other for enhancing the comparison of said path with said ideal path.

4. The system of claim 1, wherein:
   said object is a golf club head of a golf club;
   said path is a swing trajectory of the golf club head.

5. The system of claim 4, further comprising means for determining, from said successive coordinate positions, the speed and acceleration of the golf club head at a point along said path where said path intersects a predetermined golf tee location, wherein means (d) comprises means for displaying said path, speed, and acceleration.

6. The system of claim 4, wherein means (d) comprises first and second liquid crystal displays (LCDs) for displaying top and back perspective views, respectively, of said path and an ideal golf club head path for comparison thereto.

7. The system of claim 4, further comprising a divergent light source incorporated within the common housing and for shining a divergent cone of light coincident within the sensing cone, wherein the golf club head comprises means for reflecting the light from the divergent light source as the first, second, and third light beams.

8. The system of claim 7, further comprising said means for reflecting, wherein said means for reflecting comprises an at least partially-spherical reflector attachable to said golf club.

9. The system of claim 8, further comprising a light sensor mounted within said common housing above said angle detectors, wherein said reflector is attachable via a snap-on means to a shaft of said golf club near said golf club head and comprises a flat reflector portion adapted to reflect the light from the divergent light source as a fourth light beam directed at said light sensor at a point along said path, the system further comprising means for determining a club head face angle at a predetermined point of impact in accordance with the light sensed by said light sensor.

10. The system of claim 1, wherein said object comprises a divergent light source for providing the first, second, and third light beams.

11. The system of claim 1, wherein said object is a projectile.

12. The system of claim 11, further comprising said projectile, said projectile comprising a divergent light source for providing the first, second, and third light beams.

13. The system of claim 1, wherein said first, second, and third detectors each comprise a respective solid state incident angle detector (IAD) having two adjacent photodiode elements, each respective IAD comprising means for determining the respective angle based upon the ratio of light from the respective light beam falling on the two adjacent photodiode elements of the respective IAD.

14. The system of claim 1, wherein said first, second, and third detectors each comprise a respective solid state position sensitive detector (PSD) having a continuous strip of photosensitive surface, each respective PSD comprising means for determining the respective angle based upon the position at which the respective light beam falls on the strip.

15. The system of claim 1, wherein said first and second reference lines are a line connecting said first and second angle detectors and said third reference line is the Z axis of the 3D coordinate system.

* * * * *